W. C. PENCE.
WEED CUTTER.
APPLICATION FILED JAN. 8, 1913.

1,081,985.

Patented Dec. 23, 1913.

Witnesses
Robert M. Surphent
A. D. Hurd

Inventor
W. C. Pence.

By Watson E. Coleman
Attorney

UNITED STATES PATENT OFFICE.

WILLIAM C. PENCE, OF WARDEN, WASHINGTON.

WEED-CUTTER.

1,081,985.

Specification of Letters Patent.

Patented Dec. 23, 1913.

Application filed January 8, 1913. Serial No. 740,895.

*To all whom it may concern:*

Be it known that I, WILLIAM C. PENCE, a citizen of the United States, residing at Warden, in the county of Grant and State of Washington, have invented certain new and useful Improvements in Weed-Cutters, of which the following is a specification, reference being had to the accompanying drawings.

This invention relates to new and useful improvements in weed cutters and more particularly to a weed cutter which is especially adapted for use for cutting the weeds upon railway tracks, the object of the invention being to provide a weed cutter of this character which is adapted to be applied to a car or truck which will travel over the rails at a sufficient rate of speed so that the knives carried by the cutter will clip the weeds off close to the ties.

Another object of the invention is to provide a weed cutter of the above character which will possess advantages in points of efficiency and durability, is inexpensive of manufacture and at the same time is simple in construction and operation.

With the above and other objects in view, the invention consists in the novel features of construction and the combination and arrangement of parts hereinafter more fully described, pointed out in the claims and shown in the accompanying drawings, in which—

Figure 1:
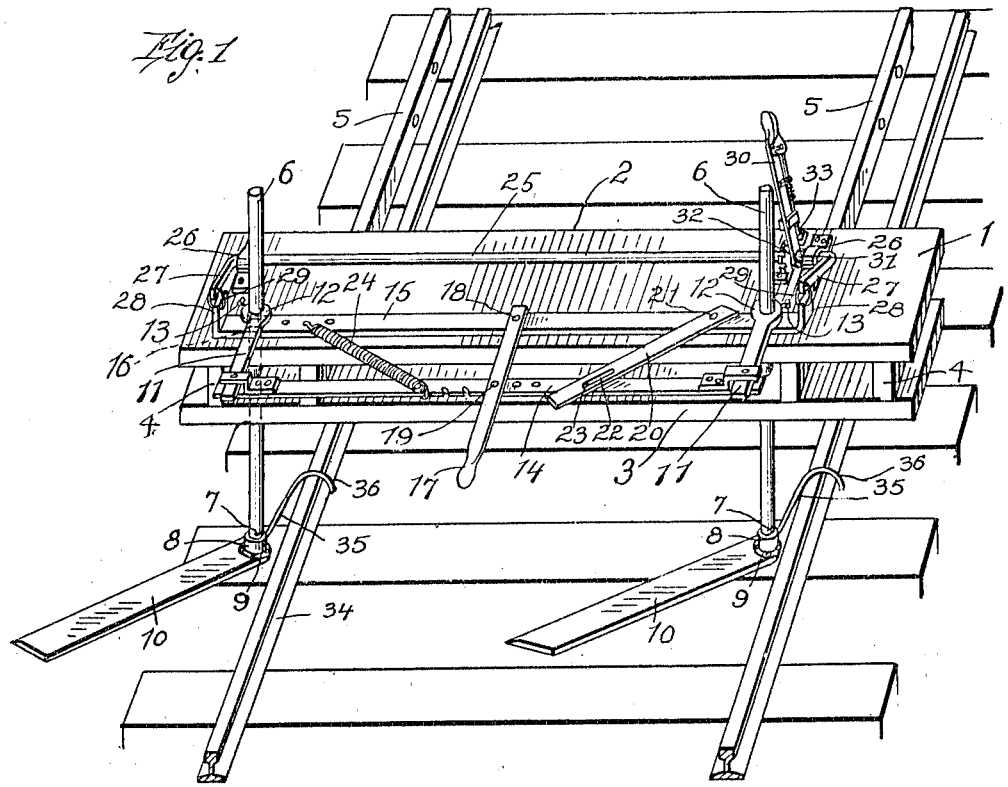
Figure 2:
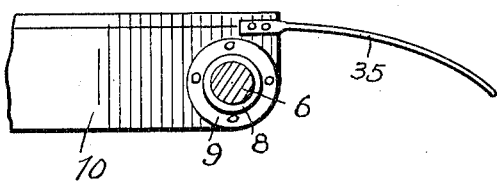
Figure 3:
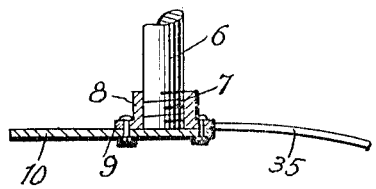

Figure 1 is a rear perspective of a weed cutter constructed in accordance with my invention. Fig. 2 is a detail transverse section taken through one of the standards and Fig. 3 is an enlarged detail sectional view illustrating the manner of securing the knife blades to the standards.

Referring more particularly to the drawings, 1 indicates the supporting frame which comprises the two planks 2 and 3 which are arranged in superimposed relation and secured in such position by means of the cross pieces 4 and the inner ends of the bars 5, said bars projecting beyond the longitudinal edges of the planks and adapted to be bolted or otherwise secured to the rear of the motor truck, hand truck or any other suitable railway car. Rotatably mounted within suitable openings formed in the planks 2 and 3 are the standards 6, the lower ends of which are threaded as shown at 7 and adapted to engage within the threaded socket 8, said socket being provided with an annular flange 9 which is adapted to be bolted or otherwise detachably secured to one end of the cutting blades 10.

Mounted upon the standards 6 and disposed above the frame 1 are the rearwardly projecting arms 11, said standards being adjustably mounted within the circular end 12 of the arms and held in various adjusted positions by means of the set screws 13. Pivotally secured to the rear ends of the arms 11 is a longitudinal bar 14 which is adapted to be actuated to rotate the standard 6 so that the cutting blades 10 may be disposed in various angular positions. Arranged in parallel relation with the bar 14 is a second and larger bar 15 which is provided with openings 16 adjacent each end thereof adapted to receive the standards 6 so that said bar will be slidably mounted thereon for vertical movement. A lever 17 is provided having one end pivotally secured to the intermediate portion of the bar 15 as shown at 18 and connected at its intermediate portion to the bar 14 as shown at 19 so that the bar 14 may be readily actuated to adjust the knives 10, through the medium of the arms 11 and standards 6, to any suitable angular position. It will be understood that the bar 15 is relatively fixed to the frame and held against longitudinal movement by means of the standards 6.

A guide rod 20 is provided having one end pivotally secured to the bar 15 as shown at 21 and the other end provided with an elongated slot 22 which is adapted to receive a vertically disposed pin 23 carried by the bar 14 so that the guide member will be adjustably secured to the latter bar. A coil spring 24 is provided, one end of which is adjustably secured to the bar 15 and the other end adjustably secured to the bar 14 so that in case the knives 10 strike an obstruction, they may be moved back toward the rail without injuring any of the other mechanism. It will be apparent that if the knives strike an obstruction, the spring 24 will be placed under tension, while the pin 23 will be removed to the opposite end of the slot in which it is normally disposed and after the knives have passed beyond the obstruction, they will be returned to their normal position by means of the coil spring, the pin 23 limiting the movement of the bar 14.

A longitudinally disposed operating rod 25 is suitably mounted within the bearings 26 at each end of the frame and having its ends bent at right angles and projecting rearwardly as shown at 27, the extreme ends of said rod being suitably connected to the upturned ends 28 of the bar 15 by means of the links 29. An operating lever 30 is provided, the lower end of which is secured upon the rod 25 as shown at 31 and is adapted to operate upon a rack 32, the spring pressed pawl 33 carried by the lever being adapted to engage said rack to hold the lever in various adjusted positions. From this it will be apparent that by the adjustment of the lever, the bar 15 may be raised and lowered, which in turn will raise and lower the knives 10 so that the same may readily pass over road crossings, cattle guards and other obstructions along the track. The knives may also be raised to an inoperative position by means of the lever 30 when the device is not in use.

In Fig. 1, I have illustrated the knives 10 arranged upon the left hand side of the track rail 34, one of the knives cutting the weeds upon the outside of the track rails while the other knife is cutting one-half of the space between the rails, and upon the return trip of the machine, the knives will be reversed to the position shown in the above figure. Secured to the inner ends of the knives 10 are the rods 35, the outer ends of which are adapted to curve over the rails as shown at 36 so that the weeds and grass growing next to the rail may be thrown out into the path of the knives so that they will be readily cut. It will also be noticed that the spring 24 and the guide bar 20 may be readily adjusted to suit the positions in which the knives 10 are adapted to be arranged.

From the above description taken in connection with the accompanying drawings, it will be readily apparent that I have provided a simple and durable weed cutting device which is particularly adapted to be applied to the rear of a railway motor car, hand truck or other vehicle adapted for use on a railway. It will also be apparent that the device is extremely simple in construction and can be manufactured at a comparatively low cost. The device is also adapted to be quickly and easily applied to a railway vehicle or detached therefrom.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. In a device of the character described, the combination of a frame, standards adjustably mounted in said frame, cutting knives detachably secured to the lower ends thereof, means for adjusting said standards vertically to raise and lower said knives, arms having one end adjustably secured to said standards, a longitudinal bar having its ends pivotally secured to the other ends of said arms, and means for actuating said bar to adjust the knives to various angular positions.

2. In a device of the character described, the combination of a frame, standards adjustably mounted in said frame, means for adjusting said standards vertically to raise and lower said knives, cutting knives detachably secured to the lower ends thereof, arms having one end adjustably secured to said standards, a longitudinal bar having its ends pivotally secured to the other ends of said arms, a second longitudinal bar arranged in spaced relation with the first bar and slidably mounted upon said standard, said second bar being disposed beneath the ends of said arms, means for actuating the first bar to adjust said knives to various angular positions and means for raising and lowering the second bar which in turn will raise and lower said knives.

3. In a device of the character described, the combination of a frame, standards adjustably mounted in said frame, cutting knives detachably secured to the lower ends thereof, arms having one end adjustably secured to said standards, a longitudinal bar having its ends pivotally secured to the other end of said arms, a second longitudinal bar slidably mounted upon said standards, an operating shaft mounted upon the frame and having its ends connected to the ends of the second bar, means for actuating said shaft to raise and lower the second bar whereby the standards will be adjusted vertically to raise and lower said knives, means for actuating the first bar to adjust said knives to various angular positions and means for retaining said knives in their operative position.

In testimony whereof I hereunto affix my signature in the presence of two witnesses.

WILLIAM C. PENCE.

Witnesses:
S. B. HANGEN,
P. J. TRONTMANN.